(12) United States Patent
Ji et al.

(10) Patent No.: US 12,398,951 B2
(45) Date of Patent: Aug. 26, 2025

(54) CONTROL METHOD FOR REFRIGERATING AND FREEZING DEVICE, AND REFRIGERATING AND FREEZING DEVICE

(71) Applicants: CHONGQING HAIER REFRIGERATION ELECTRIC APPLIANCE CO., LTD., Chongqing (CN); QINGDAO HAIER REFRIGERATOR CO., LTD., Shandong (CN); HAIER SMART HOME CO., LTD., Shandong (CN)

(72) Inventors: Lisheng Ji, Qingdao (CN); Chunyang Li, Qingdao (CN); Zhiqiang Han, Qingdao (CN); Zhanpeng Cui, Qingdao (CN); Feifei Qi, Qingdao (CN); Kai Wang, Qingdao (CN)

(73) Assignees: CHONGQING HAIER REFRIGERATION ELECTRIC APPLIANCE CO., LTD., Chongqing (CN); QINGDAO HAIER REFRIGERATOR CO., LTD., Shandong (CN); HAIER SMART HOME CO., LTD., Shandong (CN)

( * ) Notice: Subject to any disclaimer, the term of this patent is extended or adjusted under 35 U.S.C. 154(b) by 257 days.

(21) Appl. No.: 18/004,536

(22) PCT Filed: Jun. 29, 2021

(86) PCT No.: PCT/CN2021/103181
§ 371 (c)(1),
(2) Date: Jan. 6, 2023

(87) PCT Pub. No.: WO2021/223779
PCT Pub. Date: Nov. 11, 2021

(65) Prior Publication Data
US 2023/0243584 A1    Aug. 3, 2023

(30) Foreign Application Priority Data

Jul. 8, 2020   (CN) .......................... 202010653070.2

(51) Int. Cl.
*F25D 29/00* (2006.01)
*F25D 11/02* (2006.01)
(Continued)

(52) U.S. Cl.
CPC .............. *F25D 29/00* (2013.01); *F25D 11/02* (2013.01); *F25D 23/003* (2013.01);
(Continued)

(58) Field of Classification Search
CPC ........ F25D 29/00; F25D 11/02; F25D 23/003; F25D 31/005; F25D 2600/06;
(Continued)

(56) References Cited

U.S. PATENT DOCUMENTS 10,935,301 B2    3/2021  Sung
2003/0041614 A1  3/2003  Burn
(Continued)

FOREIGN PATENT DOCUMENTS

CN    2619366 Y  *  6/2004
CN    107543351 A    1/2018
(Continued)

OTHER PUBLICATIONS

Office Action issued for Japan Patent Application No. 2023501228 mailed Jun. 24, 2024, with English translation (9 pages).
(Continued)

*Primary Examiner* — Kun Kai Ma
(74) *Attorney, Agent, or Firm* — troutman pepper locke; Tim Tingkang Xia, Esq.

(57) ABSTRACT

Provided are a control method for a refrigerating and freezing device, and the refrigerating and freezing device. The
(Continued)

refrigerating and freezing device includes a cabinet provided with a groove communicating with a surrounding environment and sunken inwards, and at least one fan for promoting air of the surrounding environment to flow into the groove. The control method includes: judging whether a temperature in the groove is less than or equal to a dew point temperature; and if yes, controlling the fan to operate at a first preset rotation speed. The temperature in the groove is increased by controlling the fan to operate to introduce hot air of the surrounding environment into the groove when the temperature in the groove is less than or equal to the dew point temperature, which avoids condensation in the groove and improves safety and reliability of electrical parts in the groove.

7 Claims, 5 Drawing Sheets

(51) Int. Cl.
*F25D 23/00* (2006.01)
*F25D 31/00* (2006.01)

(52) U.S. Cl.
CPC ...... *F25D 31/005* (2013.01); *F25D 2317/068* (2013.01); *F25D 2600/02* (2013.01); *F25D 2600/06* (2013.01)

(58) Field of Classification Search
CPC ...... F25D 2600/02; F25D 21/04; F25D 23/12; F25B 2600/11; Y02B 30/70; H05B 6/62
See application file for complete search history.

(56) References Cited

U.S. PATENT DOCUMENTS

2018/0274825 A1 9/2018 Choi et al.
2019/0107296 A1* 4/2019 Clark ...................... F24F 11/30

FOREIGN PATENT DOCUMENTS

| CN | 107782044 A | | 3/2018 | |
|---|---|---|---|---|
| CN | 109990562 A | | 7/2019 | |
| CN | 209893721 U | | 1/2020 | |
| CN | 209893723 U | * | 1/2020 | ............ A23L 3/365 |
| CN | 211041170 U | * | 7/2020 | |
| JP | H08-205999 A | | 8/1996 | |
| JP | 2006-114532 A | | 4/2006 | |
| JP | 2013-029220 A | | 2/2013 | |
| KR | 20180114591 A | | 10/2018 | |
| WO | WO-2011135863 A1 | * | 11/2011 | ........... F25D 17/065 |

OTHER PUBLICATIONS

European Search Report for European Patent Application No. 21799887.1 dated Oct. 11, 2023 (4 pages).
1st Office Action for European Patent Application No. 21799887.1 dated Nov. 6, 2023 (9 pages).
1st Examination Report for Australian Patent Application No. 2021268441 dated Oct. 19, 2023 (2 pages).
International Search Report and Written Opinion for PCT/CN2021/103181 (ISA/CN) mailed Aug. 23, 2021 (8 pages).

* cited by examiner

CONTROL METHOD FOR REFRIGERATING AND FREEZING DEVICE, AND REFRIGERATING AND FREEZING DEVICE

CROSS-REFERENCE TO RELATED APPLICATIONS

The present application is a national phase entry of International Application No. PCT/CN2021/103181, filed Jun. 29, 2021, which claims priority to Chinese Application No. 202010653070,2, filed Jul. 8, 2020, which are each incorporated herein by reference in entirety.

FIELD OF THE INVENTION

The present invention relates to the field of refrigerating and freezing, and particularly relates to a control method for a refrigerating and freezing device, and the refrigerating and freezing device.

BACKGROUND OF THE INVENTION

In order to facilitate heat dissipation of part of electrical parts of a refrigerator, in the prior art, the part of electrical parts that need to dissipate heat are arranged on the outer side of a thermal insulating layer of the refrigerator. But, since the electrical parts themselves need to occupy a certain space, there is a need for a heat-dissipating gap between the electrical parts and a cover plate, while taking into account that the overall height or thickness of the refrigerator cannot be arbitrarily changed, a cabinet of the refrigerator is provided with a groove communicating with the surrounding environment, which is used to accommodate the part of electrical parts that need to dissipate heat and a fan for heat dissipation. However, the arrangement of the groove results in that a corresponding thermal insulating layer is relatively thin. When the humidity of the surrounding environment is high and the electrical parts are not started, a phenomenon of condensation would occur, leading to a malfunction of the electrical parts and even potential safety hazards. All things considered, there is a need for a control method capable of improving safety and reliability and used for a refrigerating and freezing device, and the refrigerating and freezing device in devising.

BRIEF DESCRIPTION OF THE INVENTION

One objective of a first aspect of the present invention is to overcome at least one technical defect of the prior art and to provide a control method for a refrigerating and freezing device.

One further objective of the first aspect of the present invention is to prevent a fan from being started frequently.

Another further objective of the first aspect of the present invention is to shorten the continuous working time of the fan.

One objective of a second aspect of the present invention is to provide a refrigerating and freezing device.

According to the first aspect of the present invention, provided is a control method for a refrigerating and freezing device. The refrigerating and freezing device includes a cabinet provided with a groove communicating with a surrounding environment and recessed inwards, and at least one fan for promoting air of the surrounding environment to flow into the groove. The control method includes:

judging whether a temperature in the groove is less than or equal to a dew point temperature; and
if yes, controlling the fan to operate at a first preset rotation speed.

Optionally, after the step of controlling the fan to operate at a first preset rotation speed, the control method also includes:
judging whether the temperature in the groove is greater than or equal to an ambient temperature; and
if yes, controlling the fan to stop operating after a first preset time.

Optionally, after the step of controlling the fan to operate at a first preset rotation speed, the control method also includes:
controlling, when the temperature in the groove is greater than or equal to an ambient temperature, the fan to stop operating.

Optionally, the refrigerating and freezing device includes an electromagnetic wave generation system. A power supply module of the electromagnetic wave generation system is at least partially arranged in the groove. After the step of controlling the fan to operate at a first preset rotation speed, the control method also includes:
judging whether the temperature in the groove is greater than or equal to an ambient temperature; and
if not, powering on the power supply module to produce heat.

Optionally, after performing the step of controlling the fan to operate at a first preset rotation speed for a second preset time, the step of judging whether the temperature in the groove is greater than or equal to the ambient temperature is performed.

Optionally, the control method further includes:
stopping powering on the power supply module when the temperature in the groove is greater than or equal to the ambient temperature.

Optionally, the refrigerating and freezing device includes an electromagnetic wave generation system. An electromagnetic wave generation module of the electromagnetic wave generation system is at least partially arranged in the groove. Before the step of judging whether the temperature in the groove is less than or equal to a dew point temperature, the control method further includes:
judging whether the electromagnetic wave generation module works;
if yes, controlling the fan to operate at a second preset rotation speed; and
if not, performing the step of judging whether the temperature in the groove is less than or equal to a dew point temperature, wherein
the second preset rotation speed is greater than the first preset rotation speed.

Optionally, a temperature of the electromagnetic wave generation module is used as the temperature in the groove.

According to the second aspect of the present invention, provided is a refrigerating and freezing device, including:
a cabinet, provided with a groove communicating with a surrounding environment and recessed inwards;
at least one fan, configured to promote air of the surrounding environment to flow into the groove; and
a controller, including a processing unit and a storage unit storing a computer program which, when executed by the processing unit, is used to implement the control method according to any one of the embodiments of the present invention.

Optionally, the refrigerating and freezing device further includes:

an electromagnetic wave generation system, including an electromagnetic wave generation module and a power supply module which are at least partially arranged in the groove;

a heat-dissipating fin, including a plurality of ribbed plates perpendicular to the electromagnetic wave generation module and thermally connected with the electromagnetic wave generation module, at least one of the ribbed plates thermally connected with the middle of the electromagnetic wave generation module being provided with an accommodating portion sunken in a direction close to the electromagnetic wave generation module for accommodating the at least one fan;

a housing, configured to house the electromagnetic wave generation module, the power supply module and the at least one fan; and a separation plate, arranged in the housing and located on a side of the at least one fan away from the electromagnetic wave generation module, so as to separate a space in the housing into an air inlet area and an air outlet area, wherein the electromagnetic wave generation module, the power supply module and the at least one fan are arranged in the air outlet area;

the air inlet area and the air outlet area are provided with at least one air inlet and at least one air outlet in a circumferential direction of the at least one fan, respectively, and the separation plate is provided with at least one ventilation opening at a position corresponding to the at least one fan;

airflow flowing directions from the at least one air inlet to the at least one ventilation opening are all perpendicular to airflow flowing directions from the at least one ventilation opening to each of the air outlets; and the power supply module is located on a side of the electromagnetic wave generation module perpendicular to the airflow flowing directions from the at least one ventilation opening to each of the air outlets, and thermally connected with the separation plate through a heat conduction material.

In the present invention, the temperature in the groove is increased by controlling the fan to operate to introduce the hot air of the surrounding environment into the groove when the temperature in the groove is less than or equal to the dew point temperature, which avoids condensation in the groove and improves safety and reliability of electrical parts in the groove. Furthermore, compared with an anti-condensation mode of arranging a heating wire or a heat pipe in the groove, this mode is low in cost and simple in process, and the production cost is reduced. Further, in the present invention, an original heat-dissipating fan may be utilized for anti-condensation, and the technical bias in the prior art that the heat-dissipating fan does not work when electrical parts are not started is overcome, such that the production cost is further reduced.

Further, in the present invention, when the temperature in the groove is greater than or equal to the ambient temperature, after a first preset time, the fan is controlled to stop operating, which can effectively prevent condensation in the groove, prevent the fan from being started frequently, and prolong the service life of the fan.

Further, in the present invention, the groove is further heated by powering on the power supply module to produce heat, which fully utilizes the original structure of the refrigerating and freezing device, shortens the continuous working time of the fan, further prolongs the service life of the fan, and reduces noise.

Further, in the present invention, the temperature of the electromagnetic wave generation module is used as the temperature in the groove for control, which can more accurately judge whether there would be condensation in the groove, thus effectively preventing condensation, since the inventors of the present application inventively recognize that condensation will not occur on the bottom wall of the groove at lowest temperature, but will occur on the electromagnetic wave generation module at the hot and cold junction of the middle of the groove.

These and other objectives, advantages and features of the present invention will be better understood by those skilled in the art in the light of the detailed description of specific embodiments of the present invention in conjunction with the accompanying drawings below.

BRIEF DESCRIPTION OF THE DRAWINGS

Some specific embodiments of the present invention will be described below in detail in an exemplary rather than a limiting manner with reference to the accompanying drawings.

Identical reference numerals in the accompanying drawings indicate identical or similar components or parts. It should be understood by those skilled in the art that these accompanying drawings are not necessarily drawn to scale. In the accompanying drawings.

DETAILED DESCRIPTION

Figure 1:
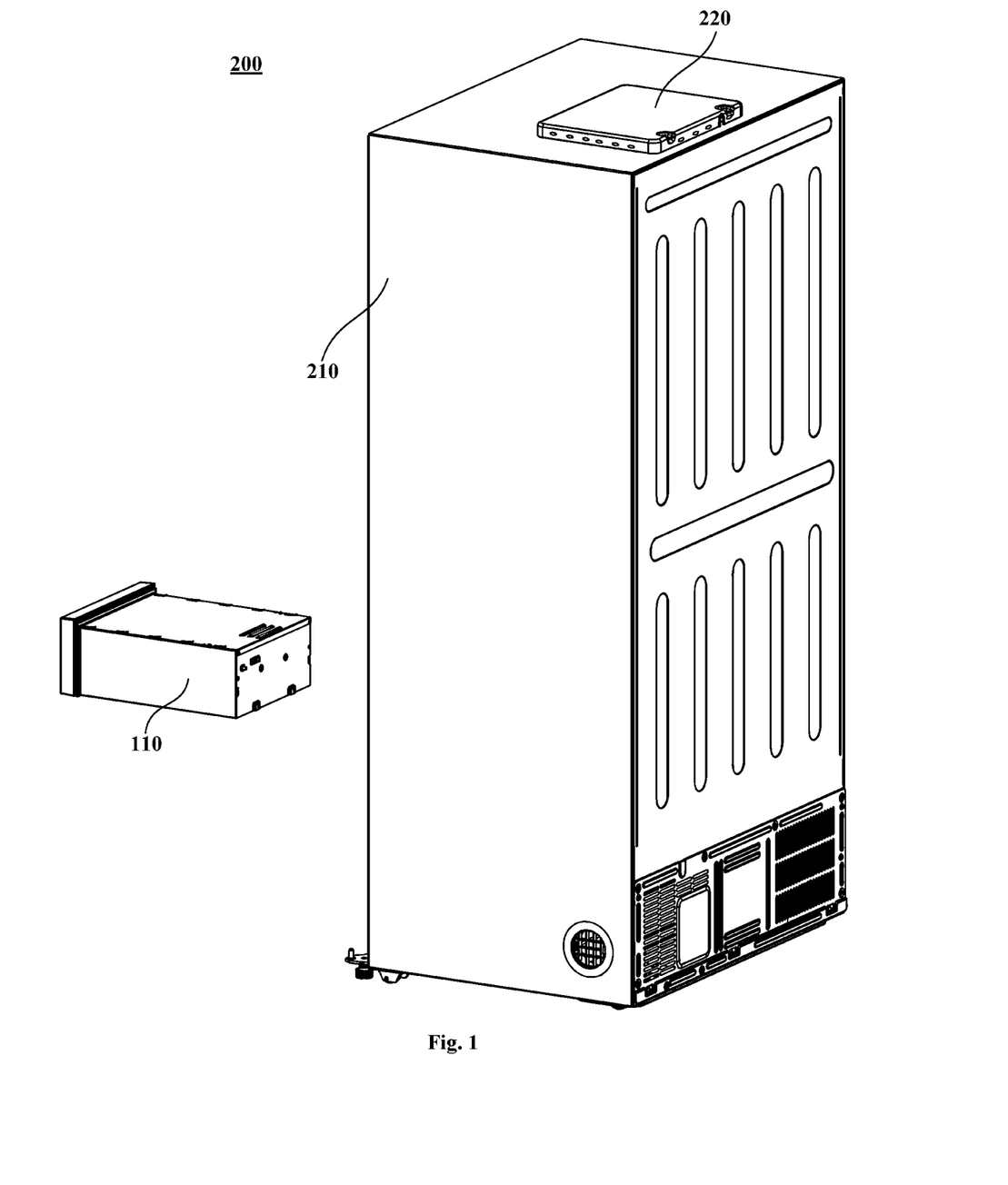
FIG. 1 is a schematic exploded view of a refrigerating and freezing device according to an embodiment of the present invention.
Figure 2:
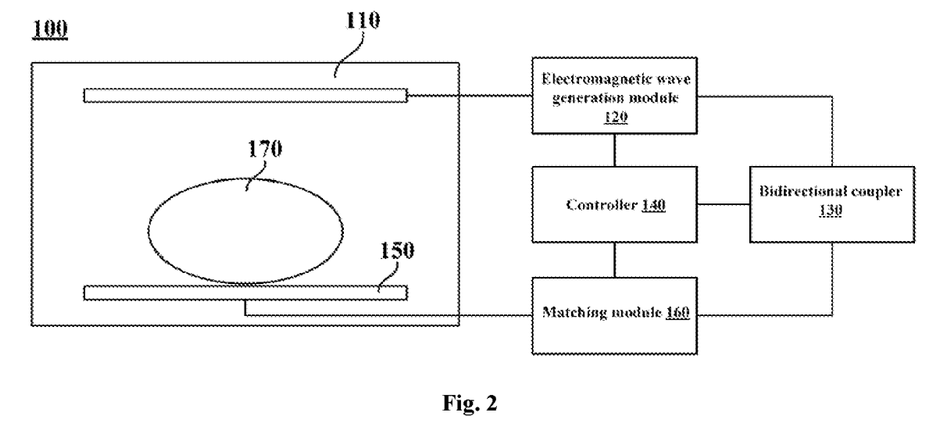
FIG. 2 is a schematic structural diagram of a heating unit according to an embodiment of the present invention.

FIG. 1 is a schematic exploded view of a refrigerating and freezing device 200 according to an embodiment of the present invention. FIG. 2 is a schematic structural diagram of a heating unit 100 according to an embodiment of the present invention. Referring to FIG. 1 and FIG. 2, the refrigerating and freezing device 200 may include a cabinet 210 defining at least one storage compartment, at least one door for opening and closing the at least one storage compartment, a heating unit 100 and a controller. In the present invention, the refrigerating and freezing device 200 may be a device having a refrigerating or freezing function, such as a refrigerator, a freezer, a cooler and a wine cabinet.

The cabinet 210 may include an inner liner defining the at least one storage compartment, an outer container, and a thermal insulating layer arranged between the inner liner and the outer container.

The heating unit 100 may include a cylinder body 110 arranged in one storage compartment of the cabinet 210, a door and an electromagnetic wave generation system.

Specifically, the cylinder body 110 may define a heating chamber for placing of an object to be handled 170, and may be provided with a taking and placing opening in its front wall for taking and placing the object to be handled 170.

The door may be mounted together with the cylinder body 110 by appropriate means, such as sliding rail connection and hinging, for opening and closing the taking and placing opening.

The electromagnetic wave generation system may be at least partially arranged in the cylinder body 110 or reach the inside of the cylinder body 110, so as to produce electromagnetic waves in the cylinder body 110 to heat the object to be handled 170.

The cylinder body 110 and the door may be provided with electromagnetic shielding features respectively, such that the door is conductively connected with the cylinder body 110 in a closed state to prevent electromagnetic leakage.

Figure 3:
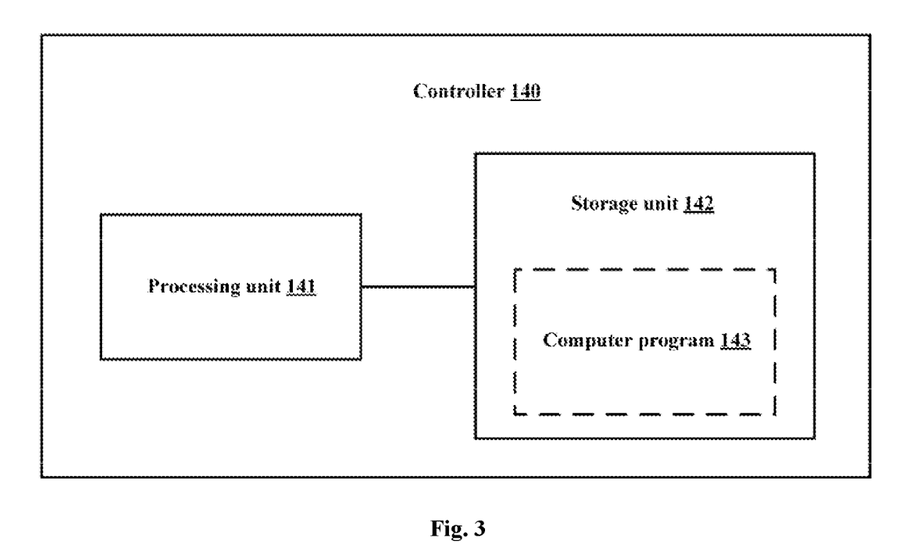
FIG. 3 is a schematic structural diagram of a controller in FIG. 2.

FIG. 3 is a schematic structural diagram of the controller in FIG. 2. Referring to FIG. 3, the controller 140 may include a processing unit 141 and a storage unit 142. The storage unit 142 stores a computer program 143 which, when executed by the processing unit 141, is used to implement the control method according to an embodiment of the present invention.

In some embodiments, the electromagnetic wave generation system may include an electromagnetic wave generation module 120, a power supply module 180, a radiating antenna 150 and a matching module 160.

The electromagnetic wave generation module 120 may be configured to generate an electromagnetic wave signal. The power supply module 180 may be configured to be electrically connected with the electromagnetic wave generation module 120, so as to supply electric energy to the electromagnetic wave generation module 120 to make the electromagnetic wave generation module 120 generate the electromagnetic wave signal.

The radiating antenna 150 may be arranged in the cylinder body 110 and is electrically connected with the electromagnetic wave generation module 120, so as to produce electromagnetic waves at a corresponding frequency according to the electromagnetic wave signal to heat the object to be handled 170 in the cylinder body 110.

The matching module 160 may be connected in series between the electromagnetic wave generation module 120 and the radiating antenna 150 and is configured to adjust load impedance of the electromagnetic wave generation module 120 by adjusting its own impedance, so as to achieve load matching and improve the heating efficiency.

In some further embodiments, the cylinder body 110 may be made of metal to serve as a receiving pole of the radiating antenna 150. In this embodiment, the cylinder body 110 itself is the electromagnetic shielding feature of the cylinder body 110.

In some other further embodiments, the electromagnetic wave generation system also includes a receiving polar plate arranged opposite to the radiating antenna 150 and electrically connected with the electromagnetic wave generation module 120. In this embodiment, the inner wall of the cylinder body 110 may be coated with a metal coating or attached with a metal mesh, etc., to serve as the electromagnetic shielding feature of the cylinder body 110.

Figure 4:
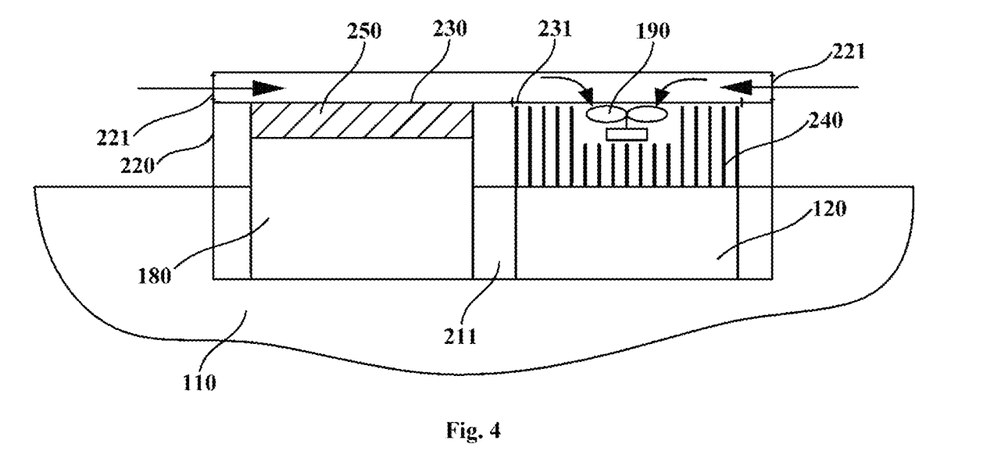
FIG. 4 is a schematic partial cutaway view of the refrigerating and freezing device shown in FIG. 1.

FIG. 4 is a schematic partial cutaway view of the refrigerating and freezing device 200 shown in FIG. 1. Referring to FIG. 4, the electromagnetic wave generation module 120 and the power supply module 180 may be arranged on the outer side of the thermal insulating layer of the cabinet 210 to reduce the influence of heat produced by the electromagnetic wave generation module 120 and the power supply module 180 on the storage compartment.

The cabinet 210 may be provided with a groove 211 communicating with a surrounding environment and sunken inwards. The electromagnetic wave generation module 120 and the power supply module 180 may be at least partially arranged in the groove 211 to reduce the magnitude of change of the overall height or thickness of the cabinet 210.

The refrigerating and freezing device 200 may also include at least one fan 190 for promoting air of the surrounding environment to flow into the groove 211.

Particularly, the processing unit 141 may be configured to control the fan 190 to operate at a first preset rotation speed when the temperature in the groove 211 is less than or equal to a dew point temperature, so as to introduce the hot air of the surrounding environment into the groove 211 to increase the temperature in the groove 211, which avoids condensation in the groove 211 and improves safety and reliability of the electromagnetic wave generation module 120 and the power supply module 180. Furthermore, compared with an anti-condensation mode of arranging a heating wire or a heat pipe in the groove 211, the mode is low in cost and simple in process.

In some embodiments, the processing unit 141 may be further configured to judge, after controlling the fan 190 to operate at the first preset rotation speed, whether the temperature in the groove 211 is greater than or equal to an ambient temperature, and control, if the temperature in the groove 211 is greater than or equal to the ambient temperature, the fan 190 to stop operating after a first preset time, so as to effectively prevent condensation in the groove 211, prevent the fan 190 from being started frequently, and prolong the service of the fan 190.

In some other embodiments, the processing unit 141 may be further configured to judge, after controlling the fan 190 to operate at the first preset rotation speed, whether the temperature in the groove 211 is greater than or equal to the ambient temperature, and instantly control, if the temperature in the groove 211 is greater than or equal to the ambient temperature, the fan 190 to stop operating. That is, when the temperature in the groove 211 is greater than or equal to the ambient temperature, the fan 190 is controlled to stop operating.

In some embodiments, the processing unit 141 may be configured to power on the power supply module 180 (which does not supply electric energy to the electromagnetic wave generation module 120, and thus the electromagnetic wave generation module 120 does not work) when it is judged that the temperature in the groove 211 is less than the ambient temperature, so as to produce heat, shorten the continuous working time of the fan 190, further prolong the service life of the fan 190 and reduce noise.

In some further embodiments, the processing unit 141 may be further configured to stop powering on the power supply module 180 when the temperature in the groove 211 is greater than or equal to the ambient temperature, so as to save energy and avoid overheating in the groove 211.

In some further embodiments, the processing unit 141 may be further configured to judge, after controlling the fan 190 to operate at the first preset rotation speed for a second preset time, whether the temperature in the groove 211 is greater than or equal to the ambient temperature, so as to further prevent condensation in the groove 211 and prevent the fan 190 from being started frequently.

In some embodiments, the processing unit 141 may be further configured to judge, before judging whether the temperature in the groove 211 is less than or equal to the dew point temperature, whether the electromagnetic wave generation module 120 is in a working state, and control, if the electromagnetic wave generation module is in the working state, the fan 190 to operate at a second preset rotation speed to dissipate heat of the electromagnetic wave generation module 120 and the power supply module 180; and judge, if the electromagnetic wave generation module is not in the working state, whether the temperature in the groove 211 is less than or equal to the dew point temperature.

The second preset rotation speed may be greater than the first preset rotation speed, so as to improve the heat-dissipating efficiency and reduce energy consumption and noise of the fan 190 during anti-condensation.

In the present invention, the ambient temperature refers to a temperature around the refrigerating and freezing device 200. For example, the refrigerating and freezing device 200 is placed indoors, and the ambient temperature is an indoor temperature. The dew point temperature may be calculated according to the ambient temperature and ambient gas pressure, which will not be described in detail.

In some embodiments, the processing unit 141 may be configured to use the temperature of the electromagnetic wave generation module 120 as the temperature in the groove 211 for control, so as to accurately judge whether condensation will be produced in the groove 211, thus effectively preventing condensation.

In some other embodiments, the processing unit 141 may be configured to use the temperature of a bottom wall of the groove 211 or an average temperature of a plurality of positions in the groove 211 as the temperature in the groove 211 for control.

In the present invention, there may be one, two, or more fans 190. In order to facilitate the understanding of the present invention, the present invention will be introduced later with one fan 190 as an example.

In some embodiments, the refrigerating and freezing device 200 may also include a heat-dissipating fin 240 thermally connected with the electromagnetic wave generation module 120, so as to increase the heat-dissipating area of the electromagnetic wave generation module 120, thus improving the heat-dissipating efficiency of the electromagnetic wave generation module 120.

The heat-dissipating fin 240 may include a plurality of ribbed plates perpendicular to the electromagnetic wave generation module 120. That is, each ribbed plate extends from the electromagnetic wave generation module 120 in a direction away from the electromagnetic wave generation module 120, and is perpendicular to a mounting surface of the ribbed plate.

The heat-dissipating fin 240 may also include a base plate made integrally with the plurality of ribbed plates for thermal connection with the electromagnetic wave generation module 120.

The fan 190 may be arranged on a side of the heat-dissipating fin 240 away from the electromagnetic wave generation module 120, and is configured to blow out airflow towards the electromagnetic wave generation module 120. That is, the electromagnetic wave generation module 120 is arranged downstream of fan 190 to reduce wind resistance and improve the heat-dissipating efficiency of the electromagnetic wave generation module 120.

The extending direction of the plurality of ribbed plates may be further set perpendicular to the direction of the electromagnetic wave generation module 120 getting close to the power supply module 180, so as to reduce the influence of heat produced by the electromagnetic wave generation module 120 on the power supply module 180.

At least one of the ribbed plates thermally connected with the middle of the electromagnetic wave generation module 120 is provided with an accommodating portion sunken in the direction close to the electromagnetic wave generation module 120.

The fan 190 may be arranged in the accommodating portion, and the projection of the fan 190 in the extending direction perpendicular to the plurality of ribbed plates is at least within at least one ribbed plate, so as to further reduce the influence of the heat on the power supply module 180, and to further improve the heat-dissipating efficiency of the electromagnetic wave generation module 120.

The fan 190 may be configured to draw airflow via the power supply module 180 and promote the airflow to be blown out towards the electromagnetic wave generation module 120, so as to overall improve the heat-dissipating efficiency of the electromagnetic wave generation module 120 and the power supply module 180 while improving structure compactness.

The refrigerating and freezing device 200 may also include a housing 220 and a separation plate. The housing 220 may be configured to house the electromagnetic wave generation module 120, the power supply module 180 and the fan 190.

The separation plate may be arranged in the housing 220 and located on a side of the fan 190 away from the electromagnetic wave generation module 120, so as to separate the space in the housing 220 into an air inlet area and an air outlet area. The fan 190 and the electromagnetic wave generation module 120 may be arranged in the air outlet area.

Figure 5:
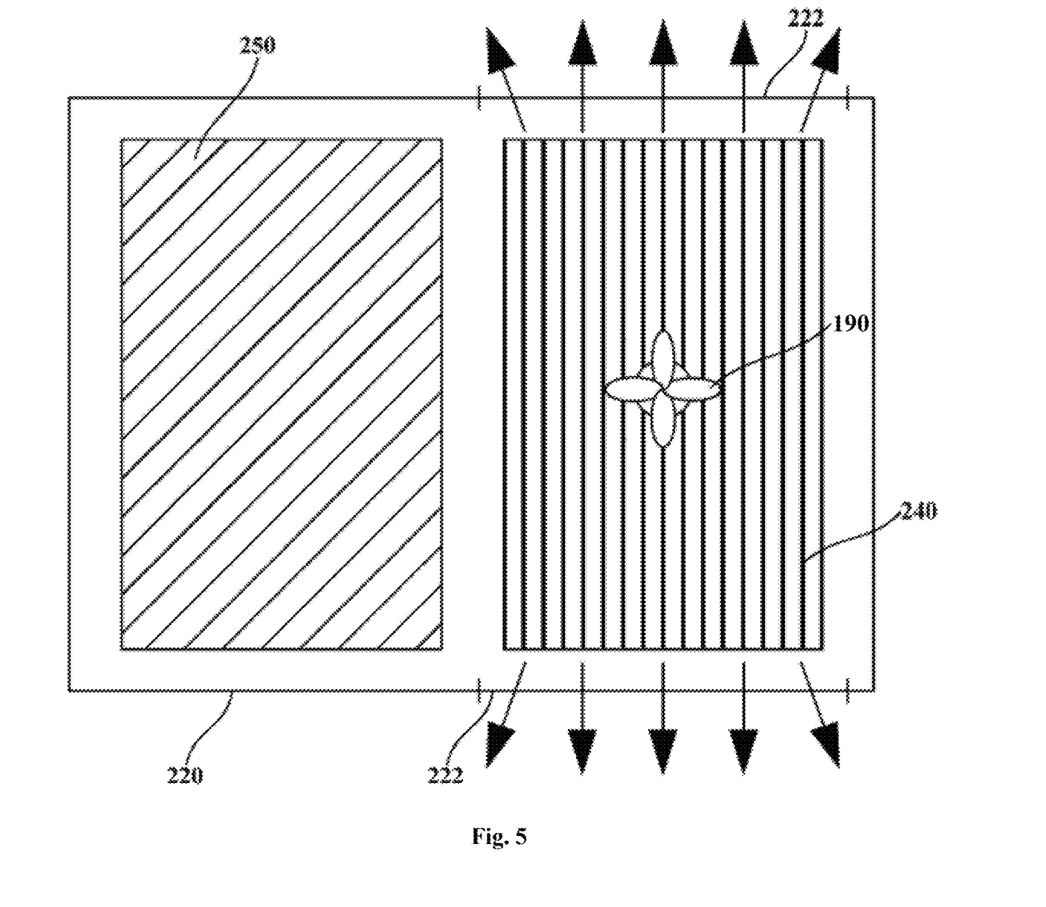
FIG. 5 is a schematic top view of an air outlet area in FIG. 4.

FIG. 5 is a schematic top view of the air outlet area in FIG. 4. Referring to FIG. 4 and FIG. 5, the air inlet area and the air outlet area are provided with at least one air inlet 221 and at least one air outlet 222 in the circumferential direction of the fan 190, respectively, and the separation plate is provided with at least one ventilation opening 231 at a position corresponding to the at least one fan 190, so as to prevent water and dust from entering the housing 220 via the air inlet 221 and the air outlet 222 to make the electromagnetic wave generation module 120 and the power supply module 180 damp and dusty, thereby avoiding potential safety hazards.

The airflow flowing directions from the at least one air inlet 221 to the at least one ventilation opening 231 are all perpendicular to the airflow flowing directions from the at least one ventilation openings 231 to each of the air outlets 222, so as to further reduce wind resistance and improve heat-dissipating efficiency.

The power supply module 180 may be arranged in the air outlet area, and is located on a side of the electromagnetic wave generation module 120 perpendicular to the airflow flowing direction from the at least one ventilation opening 231 to each air outlet 222, so as to make the fan 190 dissipate heat of the power supply module 180 and the electromagnetic wave generation module 120 respectively in the process of drawing and blowing out airflow to further reduce the influence of the heat on the power supply module 180 and improve the heat-dissipating efficiency.

Further, the refrigerating and freezing device 200 also includes a heat conduction material 250 thermally connected with the power supply module 180 and the separation plate, so as to improve the heat-dissipating efficiency of the power supply module 180.

The fan 190 may be arranged above the electromagnetic wave generation module 120. That is, the electromagnetic wave generation module 120 may be arranged above the thermal insulating layer, so as to improve the stability of the electromagnetic wave generation module 120 and the fan 190.

Figure 6:
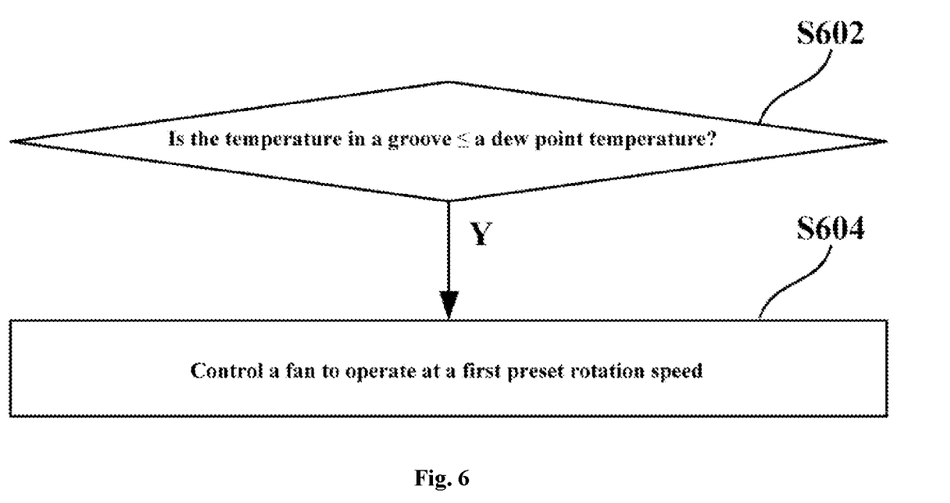
FIG. 6 is a schematic flow chart of a control method for a refrigerating and freezing device according to an embodiment of the present invention.

FIG. 6 is a schematic flow chart of a control method for the refrigerating and freezing device 200 according to an embodiment of the present invention (in the figures of the description of the present invention, "Y" represents "Yes", and "N" represents "No"). Referring to FIG. 6, the control method for the refrigerating and freezing device 200 in the present invention may include the following steps.

At step S602, whether the temperature in the groove 211 is less than or equal to the dew point temperature is judged. If yes, step S604 is performed.

At step 604, the fan 190 is controlled to operate at a first preset rotation speed.

As for the control method of the present invention, the temperature in the groove 211 is increased by controlling the fan to operate to introduce air of the surrounding environment into the groove 211 when the temperature in the groove 211 is less than or equal to the dew point temperature, which avoids condensation in the groove 211 and improves safety and reliability of electrical parts in the groove 211. Furthermore, compared with an anti-condensation mode of arranging a heating wire or a heat pipe in the groove 211, this mode is low in cost and simple in process, and the production cost is reduced.

In some embodiments, after the step S604, the control method may also include the following steps:
  judging whether the temperature in the groove 211 is greater than or equal to the ambient temperature; and
  if yes, controlling the fan 190 to stop operating after a first preset time, so as to effectively prevent condensation in the groove 211, prevent the fan 190 from being started frequently, and prolong the service life of the fan 190.

In some other embodiments, after step S604, the control method may also include the following step:
  instantly controlling, when the temperature in the groove 211 is greater than or equal to the ambient temperature, the fan 190 to stop operating.

In some embodiments, after the step S604, the control method may also include the following steps:
  judging whether the temperature in the groove 211 is greater than or equal to the ambient temperature; and
  if not, powering on the power supply module 180 (which does not supply electric energy to the electromagnetic wave generation module 120, and thus the electromagnetic wave generation module 120 does not work), so as to produce heat, shorten the continuous working time of the fan 190, further prolong the service life of the fan 190 and reduce noise.

In some further embodiments, the control method of the present invention may also include:
  stopping powering on the power supply module 180 when the temperature in the groove 211 is greater than or equal to the ambient temperature, so as to save energy and avoid overheating in the groove 211.

In some further embodiments, the control method of the present invention may also include:
  judging whether the temperature in the groove 211 is greater than or equal to the ambient temperature after performing step S604 for a second preset time, so as to further prevent condensation in the groove 211 and prevent the fan 190 from being started frequently.

In some embodiments, after step S602, the control method may also include the following steps:
  judging whether the electromagnetic wave generation module 120 works;
  if yes, controlling the fan 190 to operate at a second preset rotation speed to dissipate heat of the electromagnetic wave generation module 120 and the power supply module 180; and if not, performing step S602 to judge whether there is a need for anti-condensation.

The second preset rotation speed may be greater than the first preset rotation speed, so as to improve the heat-dissipating efficiency and reduce energy consumption and noise of the fan 190 during anti-condensation.

In the present invention, the temperature of the electromagnetic wave generation module 120 may be used as the temperature in the groove 211 for judging and control, so as to more accurately judge whether there would be condensation in the groove 211, thus effectively preventing condensation.

Figure 7:
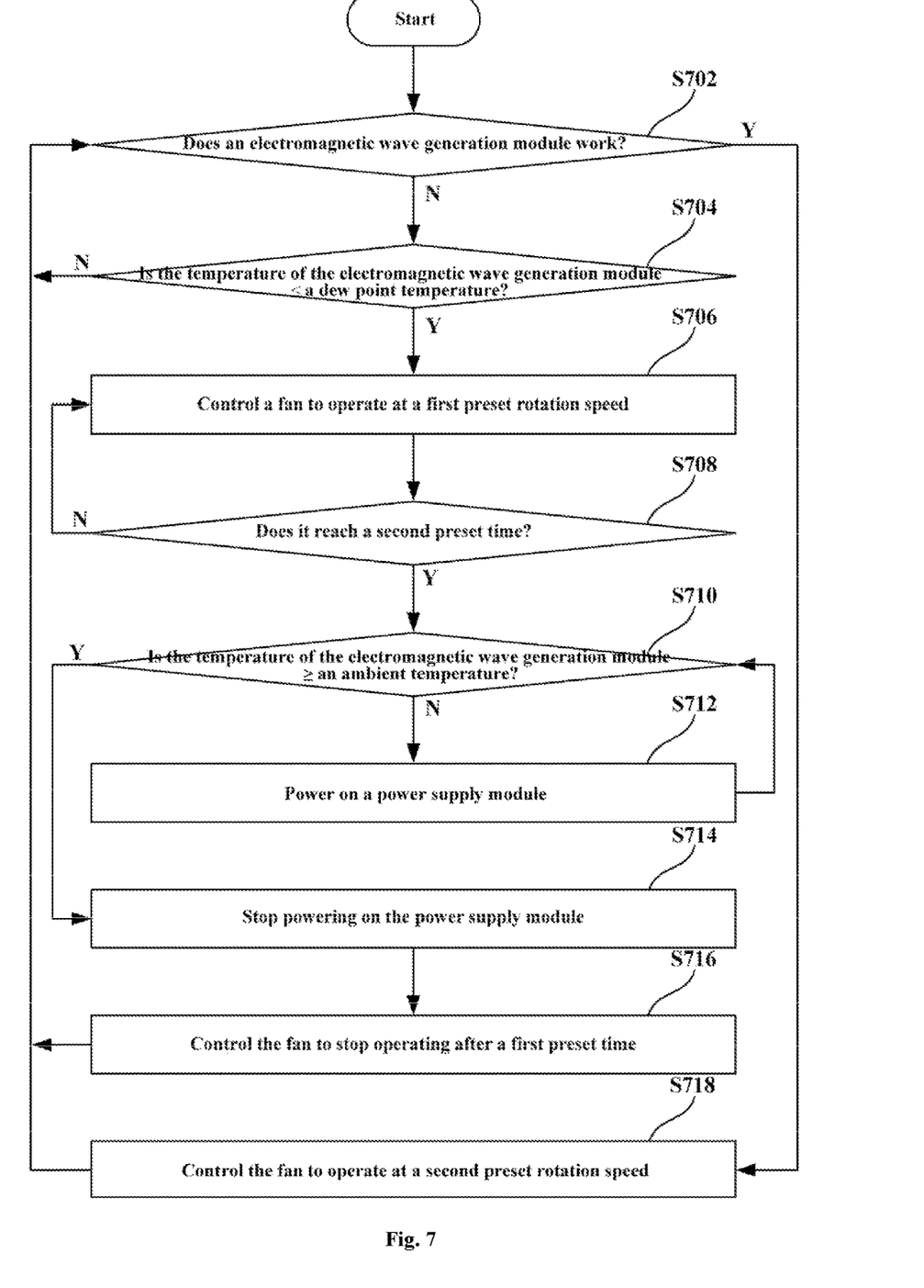
FIG. 7 is a schematic detailed flow chart of a control method for a refrigerating and freezing device according to an embodiment of the present invention.

FIG. 7 is a schematic detailed flow chart of a control method for the refrigerating and freezing device 200 according to an embodiment of the present invention. Referring to FIG. 7, the control method for the refrigerating and freezing device 200 of the present invention may include the following detailed steps.

At step S702, whether the electromagnetic wave generation module 120 is in a working state is judged. If yes, step S718 is performed; and if not, step S704 is performed.

At step S704, whether the temperature of the electromagnetic wave generation module 120 is less than or equal to the dew point temperature is judged. If yes, step S706 is performed; and if not, it returns to step S702.

At step S706, the fan 190 is controlled to operate at a first preset rotation speed.

At step S708, whether step S706 is performed for a second preset time is judged. If yes, step S710 is performed; and if not, it returns to step S706.

At step S710, whether the temperature of the electromagnetic wave generation module 120 is greater than or equal to an ambient temperature is judged. If yes, step S714 is performed; and if not, step S712 is performed.

At step S712, the power supply module 180 is powered on.

At step S714, the power supply module 180 stops being powered on. Step S716 is performed.

At step S716, after a first preset time, the fan 190 is controlled to stop operating. It returns to step S702.

At step S718, the fan 190 is controlled to operate at a second preset rotation speed. It returns to step S702.

In the present invention, if the electromagnetic wave generation module 120 starts to work in the process of performing step S704 to step S716, it instantly skips to step S718.

As understood by those skilled in the art, the control method of the present invention is also suitable for other electrical parts arranged in the groove 211.

At this point, it should be recognized by those skilled in the art that, although multiple exemplary embodiments of the present invention have been exhaustively shown and described herein, many other variations or modifications in accordance with the principles of the present invention may still be directly determined or derived from the disclosure of the present invention without departing from the spirit and scope of the present invention. Therefore, the scope of the present invention should be understood and recognized as covering all these other variations or modifications.

The invention claimed is:

1. A control method for a refrigerating and freezing device, the refrigerating and freezing device comprising a cabinet provided with a groove communicating with a surrounding environment and recessed inwards, and at least one fan for promoting air of the surrounding environment to flow into the groove, wherein the control method comprises:

judging whether a temperature in the groove is less than or equal to a dew point temperature;

if yes, controlling the fan to operate at a first preset rotation speed;

judging whether the temperature in the groove is greater than or equal to an ambient temperature; and     controlling the fan to stop operating if the temperature in the groove is greater than or equal to the ambient temperature.

2. The control method according to claim 1, comprising:

after performing the step of controlling the fan to operate at a first preset rotation speed for a second preset time, performing the step of judging whether the temperature in the groove is greater than or equal to an ambient temperature.

3. A refrigerating and freezing device, comprising:

a cabinet, provided with a groove communicating with a surrounding environment and recessed inwards;

at least one fan, configured to promote air of the surrounding environment to flow into the groove; and a controller configured to implement the control method according to claim 1.

4. The control method according to claim 1, wherein a temperature of a bottom wall of the groove or an average of temperatures of a plurality of positions in the groove is used as the temperature in the groove.

5. A control method for a refrigerating and freezing device, the refrigerating and freezing device comprising a cabinet provided with a groove communicating with a surrounding environment and recessed inwards, and at least one fan for promoting air of the surrounding environment to flow into the groove, wherein the control method comprises:

judging whether a temperature in the groove is less than or equal to a dew point temperature;

if yes, controlling the fan to operate at a first preset rotation speed;

judging whether the temperature in the groove is greater than or equal to an ambient temperature; and     if yes, controlling the fan to stop operating after a first preset time.

6. The control method according to claim 5, comprising:

after performing the step of controlling the fan to operate at a first preset rotation speed for a second preset time, performing the step of judging whether the temperature in the groove is greater than or equal to an ambient temperature.

7. The control method according to claim 5, wherein a temperature of a bottom wall of the groove or an average of temperatures of a plurality of positions in the groove is used as the temperature in the groove.

* * * * *